(12) United States Patent
Tsunooka

(10) Patent No.: US 9,103,270 B2
(45) Date of Patent: Aug. 11, 2015

(54) CONTROL APPARATUS FOR INTERNAL COMBUSTION ENGINE

(75) Inventor: Takashi Tsunooka, Gotenba (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 67 days.

(21) Appl. No.: 13/635,279

(22) PCT Filed: Mar. 16, 2011

(86) PCT No.: PCT/JP2011/056241
§ 371 (c)(1),
(2), (4) Date: Sep. 14, 2012

(87) PCT Pub. No.: WO2012/124076
PCT Pub. Date: Sep. 20, 2012

(65) Prior Publication Data
US 2013/0340423 A1    Dec. 26, 2013

(51) Int. Cl.
| F02D 23/00 | (2006.01) |
| F01N 5/04 | (2006.01) |
| G06F 19/00 | (2011.01) |
| F02B 37/00 | (2006.01) |
| F02B 37/18 | (2006.01) |

(Continued)

(52) U.S. Cl.
CPC ............... *F02B 37/00* (2013.01); *F02B 37/18* (2013.01); *F02B 37/183* (2013.01); *F02D 41/2454* (2013.01); *F01N 3/02* (2013.01); *F02D 41/0007* (2013.01); *F02D 41/14* (2013.01); *F02D 41/30* (2013.01); *F02D 2041/1415* (2013.01); *Y02T 10/144* (2013.01); *Y02T 10/40* (2013.01); *Y02T 10/44* (2013.01)

(58) Field of Classification Search
CPC ........ F02B 37/00; F02B 37/18; F02B 37/183; F02D 41/2454; F02D 41/14; F02D 2041/1415; F02D 41/0007; F02D 41/30; F01N 3/02; Y02T 10/44; Y02T 10/144; Y02T 10/40
USPC ............. 60/600–603, 280; 701/102–104, 112
See application file for complete search history.

(56) References Cited

U.S. PATENT DOCUMENTS

| 5,191,789 A * | 3/1993 | Furuya ........................ 73/114.33 |
| 6,279,551 B1 | 8/2001 | Iwano et al. |

(Continued)

FOREIGN PATENT DOCUMENTS

| JP | 60256532 A * | 12/1985 | ............... F02D 41/22 |
| JP | 11200926 A * | 7/1999 | ............... F02D 41/14 |

(Continued)

*Primary Examiner* — Thai Ba Trieu
(74) *Attorney, Agent, or Firm* — Sughrue Mion, PLLC

(57) ABSTRACT

An electronic control unit (ECU) is equipped with a turbine passing path constant that corresponds to a time required for exhaust gas to flow to an air-fuel ratio sensor via a turbine of a turbosupercharger, and a bypass path constant that corresponds to a time required for exhaust gas to flow to the air-fuel ratio sensor via a bypass passage. The ECU calculates first and second fuel injection correction amounts and in which the path constants and are reflected, respectively. The ECU selects one of the fuel injection correction amounts and based on at least an open or closed state of the waste gate valve (WGV), corrects a fuel injection amount using the selected fuel injection correction amount. It is thus possible to appropriately compensate for differences in exhaust path lengths and air-fuel ratio fluctuations that arise due to opening or closing of the WGV.

7 Claims, 7 Drawing Sheets

(51) Int. Cl.
*F02D 41/24* (2006.01)
*F02D 41/14* (2006.01)
*F02D 41/30* (2006.01)
*F01N 3/02* (2006.01)
*F02D 41/00* (2006.01)

(56) References Cited

U.S. PATENT DOCUMENTS

| | | | |
|---|---|---|---|
| 7,275,516 B1 * | 10/2007 | Cunningham et al. | 123/305 |
| 7,295,912 B2 * | 11/2007 | Yasui et al. | 701/103 |
| 7,621,256 B2 * | 11/2009 | Cunningham et al. | 701/105 |
| 7,849,842 B1 * | 12/2010 | Lewis et al. | 123/575 |
| 7,962,275 B2 * | 6/2011 | Hokuto et al. | 701/104 |
| 8,141,357 B2 * | 3/2012 | Yamagata et al. | 60/602 |
| 8,417,438 B2 * | 4/2013 | Tsunooka | 60/602 |
| 8,938,960 B2 * | 1/2015 | Moriguchi et al. | 701/104 |
| 2007/0256666 A1 * | 11/2007 | Cunningham et al. | 123/445 |
| 2008/0077304 A1 * | 3/2008 | Suzuki et al. | 701/102 |
| 2009/0210138 A1 * | 8/2009 | Hokuto et al. | 701/103 |
| 2009/0292446 A1 * | 11/2009 | Tanaka | 701/103 |
| 2012/0185157 A1 * | 7/2012 | Tsunooka | 701/103 |
| 2012/0222418 A1 * | 9/2012 | Watanabe | 60/602 |
| 2013/0024088 A1 * | 1/2013 | Suzuki et al. | 701/102 |
| 2013/0282256 A1 * | 10/2013 | Watanuki et al. | 701/102 |
| 2013/0283783 A1 * | 10/2013 | Sato | 60/603 |
| 2013/0327037 A1 * | 12/2013 | Fukui | 60/600 |

FOREIGN PATENT DOCUMENTS

| | | | | |
|---|---|---|---|---|
| JP | 2000-297663 A | | 10/2000 | |
| JP | 2009-228601 A | | 10/2009 | |
| JP | 2010185302 A | * | 8/2010 | ............ F02B 37/18 |
| JP | 2008-208740 A | | 9/2011 | |
| WO | WO 2008041109 A1 | * | 4/2008 | ............ F02D 41/02 |
| WO | WO 2008078162 A2 | * | 7/2008 | ............ F02D 41/14 |

* cited by examiner

CONTROL APPARATUS FOR INTERNAL COMBUSTION ENGINE

CROSS REFERENCE TO RELATED APPLICATIONS

This application is a National Stage of International Application No. PCT/JP2011/056241 filed on Mar. 16, 2011, the contents of all of which are incorporated herein by reference in their entirety.

TECHNICAL FIELD

The present invention relates to a control apparatus for an internal combustion engine equipped with a turbosupercharger and a waste gate valve (WGV) that is favorably used, for example, as a vehicle engine.

BACKGROUND ART

The conventional technology includes a control apparatus for an internal combustion engine that is equipped with a turbosupercharger and a WGV, as disclosed, for example, in Patent Literature 1 (Japanese Patent Laid-Open No. 2008-208740). According to the conventional technology, an air-fuel ratio sensor is provided at a position that is on a downstream side of a turbine of a turbosupercharger and on an upstream side of an exhaust purification catalyst. During operation of the engine, while air-fuel ratio feedback control is executed based on the output of the air-fuel ratio sensor, learning control that learns the contents of the feedback is executed. Further, according to the conventional technology, either one of an open position and a closed position of the WGV is set as a learning position (predetermined state), and learning control is carried out in a constant state by maintaining the WGV at the learning position when executing the learning control.

CITATION LIST

Patent Literature

Patent Literature 1: Japanese Patent Laid-Open No. 2008-208740

SUMMARY OF INVENTION

Technical Problem

In the conventional technology, exhaust gas of each cylinder arrives at the air-fuel ratio sensor in a fixed sequence that is in accordance with the firing order, and the exhaust air-fuel ratio is detected by the air-fuel ratio sensor. The detection result is reflected in the fuel injection amount of each cylinder by air-fuel ratio feedback control to thus control the exhaust air-fuel ratio. At this time, in order to deal with variations in the air-fuel ratio among cylinders, it is preferable that, at an arbitrary time point, a cylinder (detection cylinder) for which the exhaust air-fuel ratio is detected by the air-fuel ratio sensor and a cylinder (control cylinder) at which the detection result is reflected are matching (are in sync with each other).

However, in a system that employs a WGV, generally, a turbine and the WGV (bypass passage) are arranged in parallel on an upstream side of an exhaust purification catalyst. According to this configuration, differences arise with respect to the path length of an exhaust flow passage and with respect to an agitation state of the exhaust gas between a case in which the exhaust gas passes through the turbine and a case in which the exhaust gas passes through the bypass passage. Consequently, according to the conventional technology, there is the problem that when the WGV is opened or closed while executing air-fuel ratio feedback control, an output waveform of the air-fuel ratio sensor or a detection cylinder for which the air-fuel ratio is detected fluctuates, and the controllability is liable to decline or a disturbance in the air-fuel ratio is liable to arise.

The present invention has been conceived to solve the above described problem, and an object of the present invention is to provide a control apparatus for an internal combustion engine that can accurately and stably control an exhaust air-fuel ratio even when a WGV is operated.

Means for Solving the Problem

A first aspect of the present invention is a control apparatus for an internal combustion engine, comprising:

an exhaust purification catalyst that is provided in an exhaust passage of the internal combustion engine and that purifies an exhaust gas;

a turbosupercharger that has a turbine that is provided in the exhaust passage on an upstream side of the exhaust purification catalyst, and that supercharges intake air utilizing an exhaust pressure;

a bypass passage that branches from the exhaust passage on an upstream side of the turbine, and that merges with the exhaust passage at a position that is on a downstream side of the turbine and on an upstream side of the exhaust purification catalyst;

a waste gate valve that adjusts an amount of exhaust gas that flows through the bypass passage;

an air-fuel ratio sensor that is arranged on a downstream side of a position where the exhaust passage and the bypass passage merge, and that detects an air-fuel ratio on an upstream side of the exhaust purification catalyst;

first correction amount calculation means that calculates a first fuel injection correction amount based on a turbine passing transportation lag that corresponds to a time that is required for exhaust gas to flow from inside a cylinder to the air-fuel ratio sensor via the turbine of the turbosupercharger, and an output of the air-fuel ratio sensor;

second correction amount calculation means that calculates a second fuel injection correction amount based on a bypass passing transportation lag that corresponds to a time that is required for exhaust gas to flow from inside a cylinder to the air-fuel ratio sensor via the bypass passage, and an output of the air-fuel ratio sensor;

main correction amount selection means that, based on at least an open or a closed state of the waste gate valve, selects one fuel injection correction amount among the first and the second fuel injection correction amounts as a main feedback correction amount; and air-fuel ratio control means that corrects a fuel injection amount of the internal combustion engine based on the main feedback correction amount that is selected by the correction amount selection means, and executes air-fuel ratio feedback control so that an air-fuel ratio that is detected by the air-fuel ratio sensor matches a target air-fuel ratio.

In a second aspect of the present invention, wherein the main correction amount selection means comprises:

first selection means that, based on a premise that the waste gate valve is closed, selects the first fuel injection correction amount as the main feedback correction amount; and second selection means that, only in a case where the waste gate valve is in an open state and the first fuel injection correction amount is equal to or greater than a predetermined divergence determination value, selects the second fuel injection correction amount as the main feedback correction amount instead of the first fuel injection correction amount.

In a third aspect of the present invention, the control apparatus for an internal combustion engine further comprising closed-valve time main learning means that, in a case where the waste gate valve is in a closed state and the first fuel injection correction amount is equal to or greater than a predetermined closed-valve time main learning determination value, performs learning of a correction amount based on the first fuel injection correction amount.

In a fourth aspect of the present invention, the control apparatus for an internal combustion engine further comprising:

closed-valve time main learning means that, in a case where the waste gate valve is in a closed state and the first fuel injection correction amount is equal to or greater than a predetermined closed-valve time main learning determination value, performs learning of a correction amount based on the first fuel injection correction amount; and open-valve time main learning means that, in a case where the waste gate valve is in an open state and the second fuel injection correction amount is equal to or greater than a predetermined open-valve time main learning determination value, performs learning of a correction amount based on the second fuel injection correction amount.

A fifth aspect of the present invention is a control apparatus for an internal combustion engine, comprising:

an exhaust purification catalyst that is provided in an exhaust passage of the internal combustion engine and that purifies an exhaust gas;

a turbosupercharger that has a turbine that is provided in the exhaust passage on an upstream side of the exhaust purification catalyst, and that supercharges intake air utilizing an exhaust pressure;

a bypass passage that branches from the exhaust passage on an upstream side of the turbine, and that merges with the exhaust passage at a position that is on a downstream side of the turbine and on an upstream side of the exhaust purification catalyst;

a waste gate valve that adjusts an amount of exhaust gas that flows through the bypass passage;

an air-fuel ratio sensor that is arranged on a downstream side of a position where the exhaust passage and the bypass passage merge, and that detects an air-fuel ratio on an upstream side of the exhaust purification catalyst;

an oxygen concentration sensor that detects an oxygen concentration in an exhaust gas on a downstream side of the exhaust purification catalyst;

first sub-correction amount calculation means that calculates a first sub-injection correction amount based on an output target value of the oxygen concentration sensor that corresponds to a time when the waste gate valve is closed, and an output of the oxygen concentration sensor;

second sub-correction amount calculation means that calculates a second sub-injection correction amount based on an output target value of the oxygen concentration sensor that corresponds to a time when the waste gate valve is open, and an output of the oxygen concentration sensor;

sub-correction amount selection means that, based on at least an open or a closed state of the waste gate valve, selects one sub-injection correction amount among the first and the second sub-injection correction amounts as a sub-feedback correction amount; and air-fuel ratio control means that corrects a fuel injection amount of the internal combustion engine based on a main feedback correction amount that is calculated based on an output of the air-fuel ratio sensor, and the sub-feedback correction amount, and executes air-fuel ratio feedback control so that an air-fuel ratio that is detected by the air-fuel ratio sensor matches a target air-fuel ratio.

In a sixth aspect of the present invention, wherein the sub-correction amount selection means comprises:

first selection means that, based on a premise that the waste gate valve is closed, selects the first sub-injection correction amount as the sub-feedback correction amount; and second selection means that, only in a case where the waste gate valve is in an open state and the first sub-injection correction amount is equal to or greater than a predetermined sub-divergence determination value, selects the second sub-injection correction amount as the sub-feedback correction amount instead of the first sub-injection correction amount.

In a seventh aspect of the present invention, the control apparatus for an internal combustion engine further comprising:

closed-valve time sub-learning means that, in a case where the waste gate valve is in a closed state and the first sub-injection correction amount is equal to or greater than a predetermined closed-valve time sub-learning determination value, performs learning of a correction amount based on the first sub-injection correction amount; and open-valve time sub-learning means that, in a case where the waste gate valve is in an open state and the second sub-injection correction amount is equal to or greater than a predetermined open-valve time sub-learning determination value, performs learning of a correction amount based on the second sub-injection correction amount.

Advantageous Effects of Invention

According to the first invention, in accordance with an open or closed state of a WGV, a transportation lag of exhaust gas can be switched to either of a turbine passing transportation lag and a bypass passing transportation lag, and the respective transportation lags can be reflected in a first and a second fuel injection correction amount. Accordingly, differences in the exhaust path length and in air-fuel ratio fluctuations that arise due to opening or closing of the WGV can be appropriately compensated for by switching the transportation lag. Thus, feedback control of the exhaust air-fuel ratio can be performed accurately and stably without being affected by the operating state of the WGV.

According to the second invention, when the WGV is in a closed state, a first fuel injection correction amount in which a turbine passing transportation lag has been reflected can be taken as a main feedback correction amount. It is thereby possible to synchronize a detection cylinder for which an air-fuel ratio is detected and a control cylinder at which the main feedback correction amount is reflected, and effectively correct variations in the air-fuel ratio among cylinders. Further, even when the WGV is open, if the first fuel injection correction amount is less than a divergence determination value, it is judged that the influence will be small even if this fuel injection correction amount is used for control, and therefore the first fuel injection correction amount can be taken as the main feedback correction amount. Since control of the air-fuel ratio is more accurate when carried out when the WGV is in a closed state in which an exhaust gas agitating effect of the turbine is obtained, by adding a determination condition that uses a divergence determination value, a control region in which the first fuel injection correction amount is used can be extended to the open valve side. In contrast, in a case where the WGV is open and the first fuel injection correction amount is equal to or greater than the divergence determination value, it is judged that accuracy will decrease if this fuel injection correction amount is used for control, and therefore a second fuel injection correction amount in which a bypass passing transportation lag has been reflected can be taken as the main feedback correction amount. Thus, even when the WGV is open, a detection cylinder and a control cylinder can be synchronized.

According to the third invention, in a state in which the WGV is closed, a steady-state portion of deviations of the first fuel injection correction amount can be learned only in a case in which the first fuel injection correction amount increases (diverges) significantly. As a result, learning control can be always executed accurately in a constant state (closed state) in which an exhaust gas agitating effect of the turbine can be obtained. Accordingly, it is possible to increase the accuracy and stability of learning, and to suppress variations in the main learning value that are caused by opening and closing of the WGV and the like. Further, since learning control is executed only in a case in which learning is necessary due to an increase in the main feedback correction amount, excessive learning operations can be avoided.

According to the fourth invention, a main learning map for a time that the WGV is closed and a main learning map for an time that the WGV is open can be appropriately used according to the open or closed state of the WGV, and contents of a learning value that are reflected in a fuel injection amount can be appropriately switched. More specifically, for example, in a state in which the WGV is open, if a learning value that has been learned when the WGV is closed is used in a case in which variations in the air-fuel ratio among cylinders are relatively large, even if a transportation lag is appropriately selected, a main feedback amount may diverge significantly. In this case, by switching to a learning value that has been learned when the WGV is open and performing control, the main feedback amount can be decreased and control of the air-fuel ratio can be stabilized.

According to the fifth invention, a target value of sub-feedback control can be switched to either of a target value for a time that the WGV is closed and a target value for a time that the WGV is open in accordance with an open or closed state of the WGV, and the respective target values can be reflected in a sub-feedback correction amount. Therefore, a difference in an oxygen storage capacity of an exhaust purification catalyst that arises due to opening or closing of the WGV can be appropriately compensated for by switching the control target value. It is thus possible to accurately perform sub-feedback control, and the accuracy of controlling the air-fuel ratio can be improved.

According to the sixth invention, in a state in which the WGV is closed, a first sub-injection correction amount in which an output target value of an oxygen concentration sensor for a time that the WGV is closed is reflected can be taken as a sub-feedback correction amount, and the sub-feedback control can be made to conform to the oxygen storage capacity of the catalyst at a time that the WGV is closed. Further, even when the WGV is open, if the first sub-injection correction amount is less than a sub-divergence determination value, it is judged that the influence will be small even if this sub-injection correction amount is used for control, and thus the first sub-injection correction amount can be taken as the sub-feedback correction amount. Since control of the air-fuel ratio is more accurate when carried out in a state in which the WGV is closed and an exhaust gas agitating effect of the turbine is obtained, by adding a determination condition that uses a sub-divergence determination value, a control region in which the first sub-injection correction amount is used can be extended to the open valve side. In contrast, in a case where the WGV is open and the first sub-injection correction amount is equal to or greater than the sub-divergence determination value, it is judged that accuracy will decrease if this sub-injection correction amount is used for control, and therefore a second sub-injection correction amount in which an output target value of the oxygen concentration sensor at a time when the WGV is open is reflected can be taken as the sub-feedback correction amount. Thus, even when the WGV is open, it is possible to ensure convergence accuracy with respect to the target value of the sub-feedback correction amount, and to rapidly optimize the catalytic purifying capacity.

According to the seventh invention, a sub-learning map for when the WGV is closed and a sub-learning map for when the WGV is open can be appropriately used according to the open or closed state of the WGV, and a sub-learning value to be reflected in a fuel injection amount can be appropriately switched in accordance with the rate of consumption of the oxygen storage capacity of the catalyst. Thus, irrespective of the open or closed state of the WGV, it is possible to ensure convergence accuracy with respect to the target value of the sub-feedback correction amount, and to rapidly optimize the catalytic purifying capacity.

DESCRIPTION OF EMBODIMENTS

Embodiment 1

[Configuration of Embodiment 1]

Figure 1:
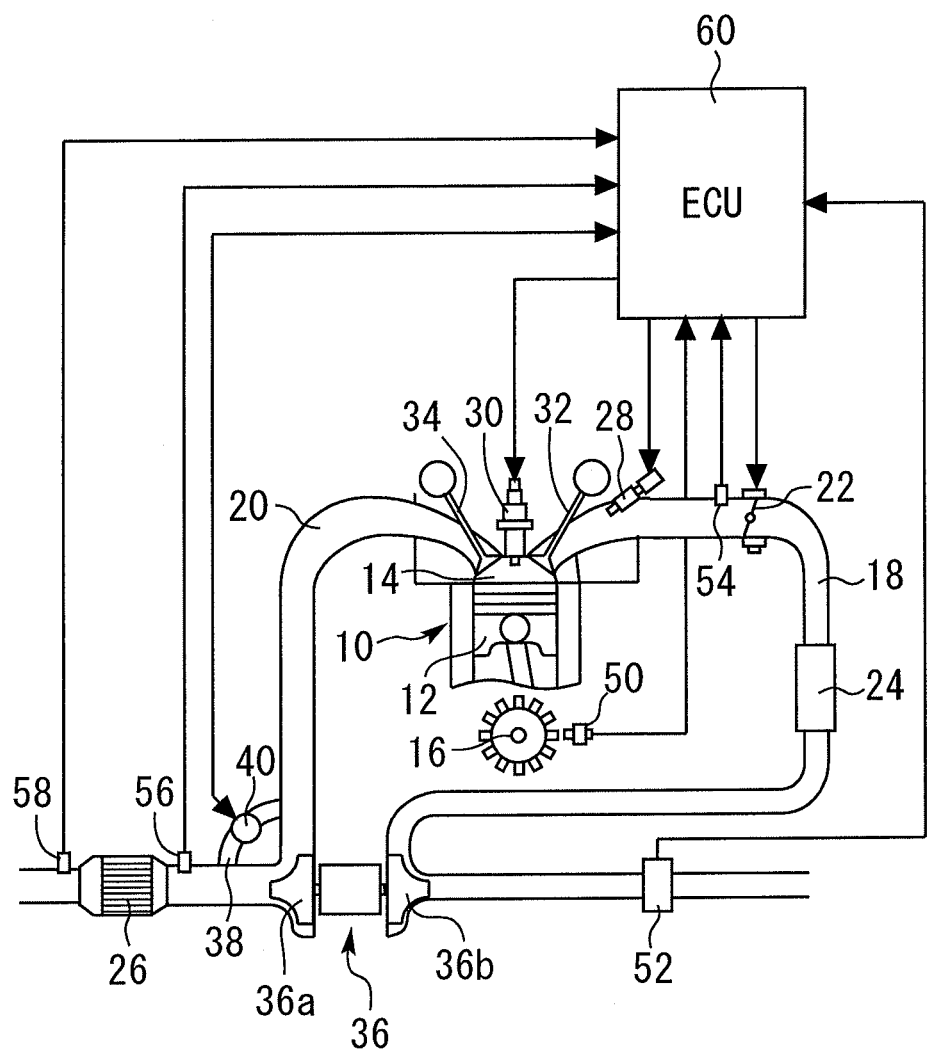
FIG. 1 is an overall configuration diagram for describing the system configuration of Embodiment 1 of the present invention.
Figure 4:
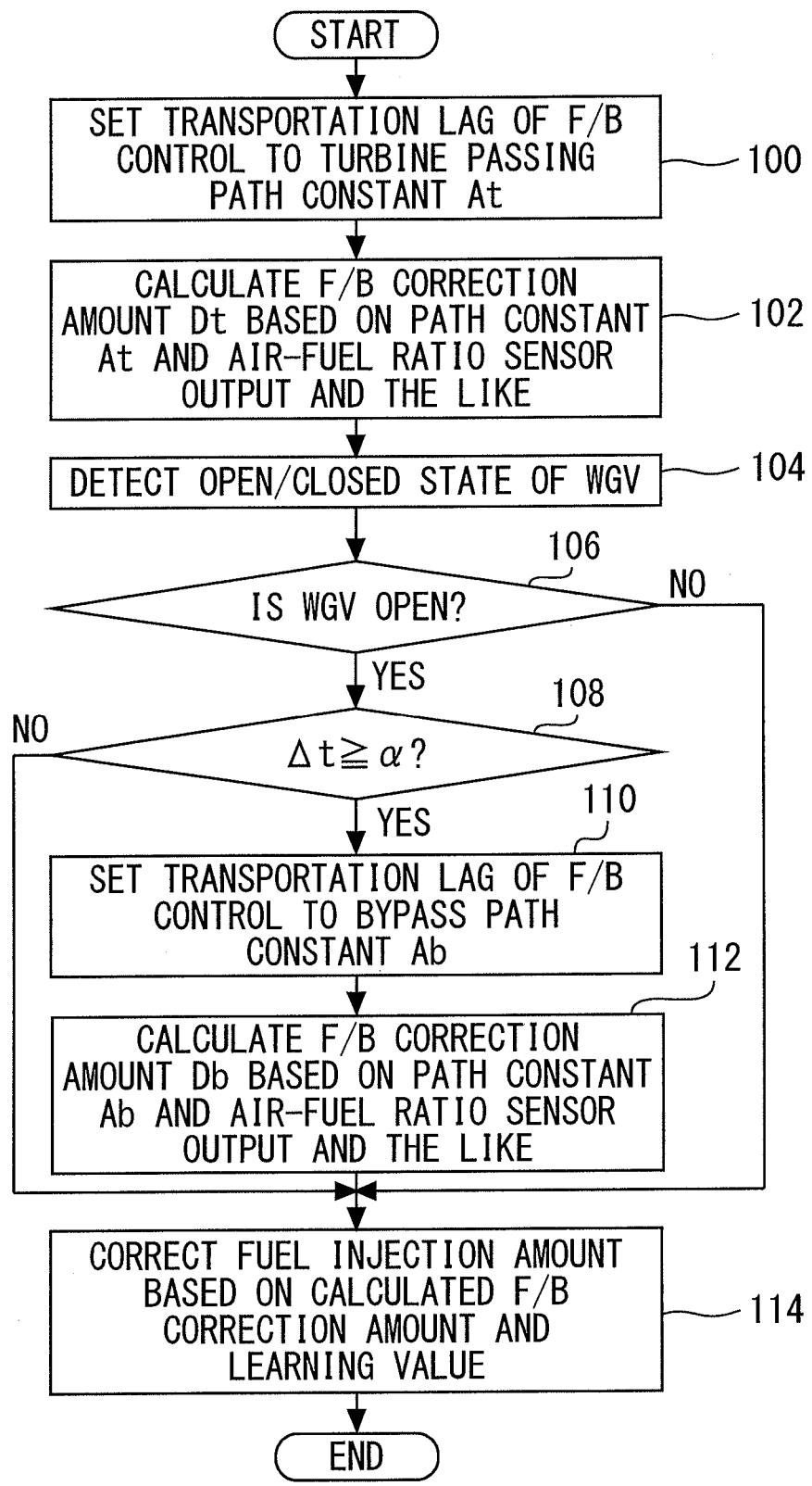
FIG. 4 is a flowchart that illustrates control executed by the ECU according to Embodiment 1 of the present invention.

Hereunder, Embodiment 1 of the present invention is described while referring to FIG. 1 and FIG. 4. FIG. 1 is an overall configuration diagram for describing the system configuration of Embodiment 1 of the present invention. The system of the present embodiment includes an engine 10 as a multi-cylinder internal combustion engine. In this connection, only one cylinder among a plurality of cylinders provided in the engine 10 is exemplified in FIG. 1. In each cylinder of the engine 10, a combustion chamber 14 is formed by a piston 12, and the piston 12 is connected to a crankshaft 16 of the engine.

The engine 10 includes an intake passage 18 that draws intake air into each cylinder, and an exhaust passage 20 through which exhaust gas is discharged from each cylinder. An electronically controlled throttle valve 22 that adjusts an intake air amount and an intercooler 24 that cools intake air are provided in the intake passage 18. An exhaust purification catalyst 26 such as a three-way catalyst that purifies exhaust gas is provided in the exhaust passage 20. Each cylinder is provided with a fuel injection valve 28 that injects fuel into an intake port, a spark plug 30 that ignites an air-fuel mixture in the cylinder, an intake valve 32 that opens and closes the intake port with respect to the inside of the cylinder, and an exhaust valve 34 that opens and closes an exhaust port with respect to the inside of the cylinder.

The engine 10 also includes a known turbosupercharger 36 that supercharges intake air utilizing an exhaust pressure. The turbosupercharger 36 is constituted by a turbine 36a that is provided in the exhaust passage 20 on an upstream side of the exhaust purification catalyst 26, and a compressor 36b that is provided in the intake passage 18. When the turbosupercharger 36 operates, the turbine 36a receives an exhaust pressure and drives the compressor 36b, and as a result intake air is supercharged by the compressor 36b.

A bypass passage 38 that bypasses the turbine 36a, and a waste gate valve (WGV) 40 that adjusts the amount of exhaust gas flowing through the bypass passage 38 are also provided in the exhaust passage 20. The bypass passage 38 is arranged in parallel with the turbine 36a, and branches from the exhaust passage 20 on the upstream side of the turbine 36a, and then merges with the exhaust passage 20 at a position that is on the downstream side of the turbine 36a and the upstream side of the exhaust purification catalyst 26. The WGV 40 is configured so as to open or close the bypass passage 38 based on a control signal that is input from an ECU 60 that is described later.

Next, a control system of the engine will be described. The system according to the present embodiment includes a sensor system that includes sensors 50, 52, 24, 56, 58, and an ECU (Electronic Control Unit) 60 that controls the operating state of the engine 10. First, the sensor system will be described. A crank angle sensor 50 outputs a signal that is synchronous with rotation of a crankshaft 16. An airflow sensor 52 detects an intake air amount of the engine. Further, an intake air pressure sensor 54 detects an intake air pressure (supercharging pressure) inside the intake passage 18.

An air-fuel ratio sensor 56 detects an air-fuel ratio on an upstream side of the exhaust purification catalyst 26, and is arranged on a downstream side of a position where the exhaust passage 20 and the bypass passage 38 merge. The air-fuel ratio sensor 56 is constituted by a known sensor that is capable of continuously detecting an air-fuel ratio and that outputs a signal that is proportional to the air-fuel ratio. An oxygen concentration sensor 58 detects an oxygen concentration in exhaust gas on a downstream side of the exhaust purification catalyst 26, and has a characteristic (Z characteristic) such that the sensor output changes suddenly between a rich side and a lean side that take a theoretical air fuel ratio as a boundary therebetween.

In addition to these sensors, the sensor system includes various sensors that are required to control the engine 10 or the vehicle (for example, a water temperature sensor that detects a temperature of the engine cooling water, and an accelerator sensor that detects an accelerator operation amount of a driver). These sensors are connected to an input side of the ECU 60. Further, various actuators including the throttle valve 22, the fuel injection valve 28, the spark plug 30, and the WGV 40 are connected to an output side of the ECU 60.

The ECU 60 is constituted, for example, by an arithmetic processing apparatus that includes a storage circuit such as a ROM, a RAM, or a non-volatile memory, and an input/output port. The ECU 60 controls the operation of the engine by driving each actuator based on information regarding the operation of the engine that is detected by the sensor system. More specifically, the ECU 60 detects the number of engine revolutions and the crank angle based on an output of the crank angle sensor 50, and calculates a load (load factor) based on an intake air amount detected by the airflow sensor 52 and the number of engine revolutions. The ECU 60 also calculates a fuel injection amount (base injection amount) based on the number of engine revolutions, the load, the warming-up state of the engine, and the existence or non-existence of an acceleration operation and the like, and calculates the fuel injection timing and the ignition timing based on the crank angle. These calculation processes are executed sequentially with respect to each cylinder in accordance with a predetermined firing order or the like.

For each cylinder, the ECU 60 drives the fuel injection valve 28 at a time point at which a fuel injection timing has been reached, and drives the spark plug 30 at a time point at which an ignition timing has been reached. Thus, an air-fuel mixture inside each cylinder can be combusted to operate the engine 10. Further, the ECU 60 executes air-fuel ratio feedback control that controls the fuel injection amount so that the exhaust air-fuel ratio matches a target air-fuel ratio based on the output of the air-fuel ratio sensor 56 and the oxygen concentration sensor 58. The target air-fuel ratio is set in a region (vicinity of the theoretical air fuel ratio or the like) in which a purification rate of the exhaust purification catalyst 26 increases. Accordingly, exhaust emissions can be improved by the present control.

The air-fuel ratio feedback control includes main feedback control and sub-feedback control. The main feedback control calculates a main feedback correction amount based on the output of the air-fuel ratio sensor 56 and corrects a fuel injection amount based on the correction amount so that the air-fuel ratio of exhaust gas flowing into the catalyst 26 matches a target air-fuel ratio. The sub-feedback control calculates a sub-feedback correction amount based on the output of the oxygen concentration sensor 58 and corrects the fuel injection amount based on the correction amount so that the air-fuel ratio of exhaust gas that flows out on the downstream side of the catalyst 26 becomes the theoretical air fuel ratio (stoichiometric ratio). Thus, in the sub-feedback control, the oxygen storage capacity (OSC) of the exhaust purification catalyst 26 is controlled in an appropriate state.

The ECU 60 also executes learning control that learns the fuel injection correction amount that has been set by the air-fuel ratio feedback control. According to the learning control, a steady-state deviation of the aforementioned main feedback correction amount and the sub-feedback correction amount are stored in the ECU 60 as learning values. The ECU 60 is equipped with a data map (learning map) in which these learning values are stored for each operating range of the engine. In the air-fuel ratio feedback control, a learning value that is acquired from the learning map in accordance with the operating state of the engine is reflected in the fuel injection amount. The air-fuel ratio feedback control and the learning control are described in detail later.

The ECU 60 also executes known supercharging pressure control that controls the supercharging pressure in accordance with the operating state of the engine. In the supercharging pressure control, the amount of exhaust gas that passes through the bypass passage 38 (and the turbine 36a of the turbosupercharger 36) is adjusted by opening or closing the WGV 40 to thereby change the supercharging pressure. It is thereby possible to make the supercharging pressure the appropriate pressure and to protect the turbosupercharger 36.

[Features of Embodiment 1]

Figure 2:
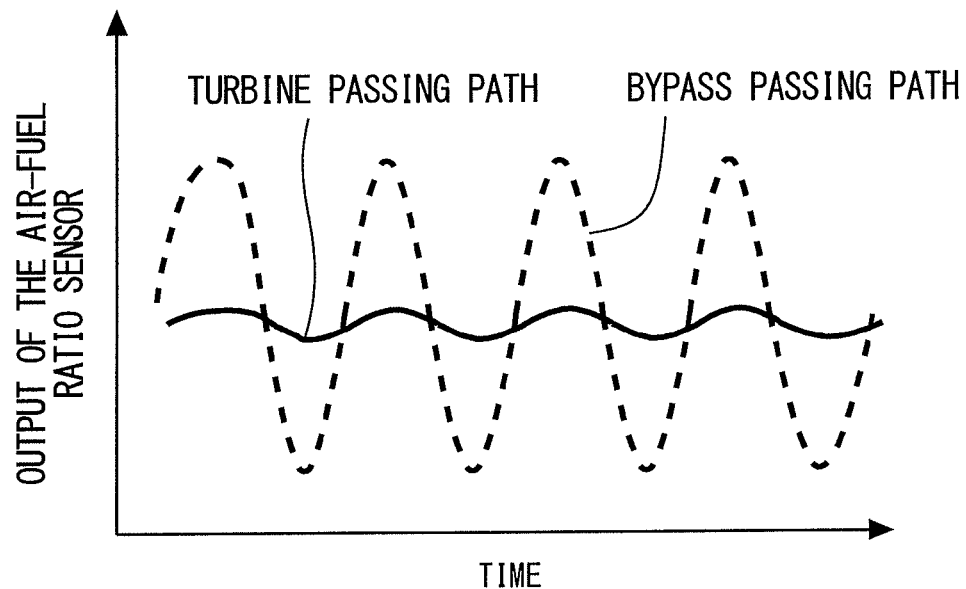
FIG. 2 is a characteristics diagram that illustrates a state in which an output waveform of the air-fuel ratio sensor changes in accordance with the flow path of the exhaust gas.

According to the present embodiment, in accordance with the open or closed state of the WGV 40, exhaust gas flows along a path (turbine passing path) that passes through the turbine 36a of the turbosupercharger 36 or flows along a path (bypass passing path) that passes through the bypass passage 38. However, as shown in FIG. 2, there is a tendency for an output waveform of the air-fuel ratio sensor 56 to differ depending on which of the paths the exhaust gas flows along. FIG. 2 is a characteristics diagram that illustrates a state in which an output waveform of the air-fuel ratio sensor changes in accordance with the flow path of the exhaust gas. When the exhaust gas flows along the turbine passing path, since the exhaust gas is agitated by the turbine 36a, it is difficult for the output waveform of the air-fuel ratio sensor 56 to be affected by variations in the air-fuel ratio among cylinders, and therefore the waveform is relatively smooth as shown by the solid line in FIG. 2. In contrast, as shown by the dashed line in FIG. 2, when the exhaust gas flows along the bypass passing path, the output waveform of the air-fuel ratio sensor 56 is liable to fluctuate significantly in accordance with variations in the air-fuel ratio among cylinders.

Figure 3:
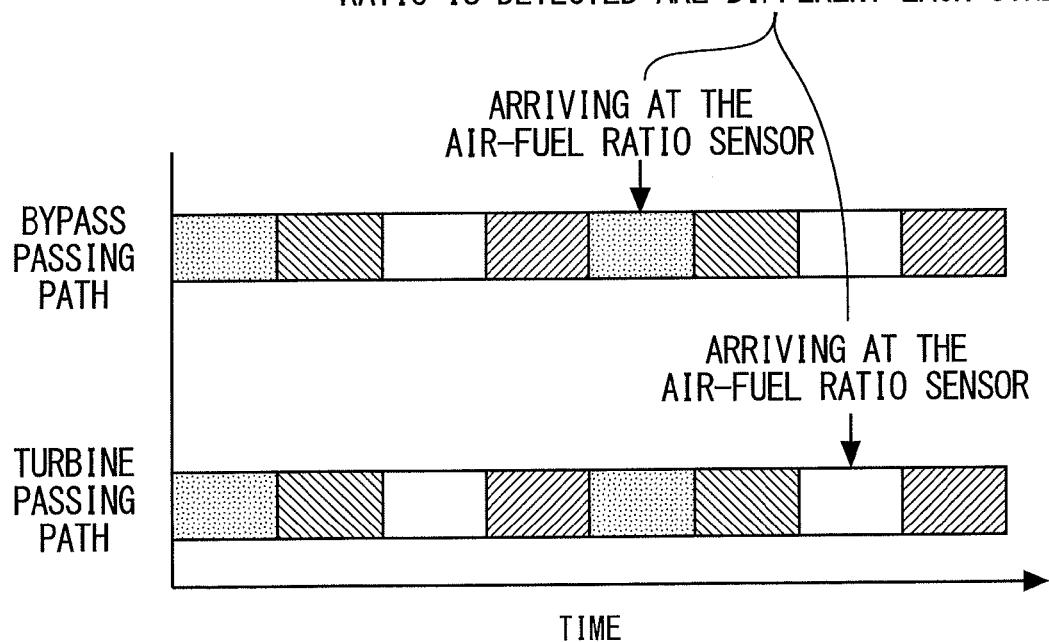
FIG. 3 is an explanatory drawing that illustrates a state in which a cylinder for which an air-fuel ratio is detected changes according to the flow path of the exhaust gas.

FIG. 3 is an explanatory drawing that illustrates a state in which a cylinder for which an air-fuel ratio is detected changes according to the flow path of the exhaust gas. In FIG. 3, a four-cylinder engine is taken as an example, and exhaust gas discharged from the respective cylinders is illustrated by different kinds of hatching, respectively. In many cases, the path length of the bypass passing path is different to (shorter than) the path length of the turbine passing path. Therefore, as shown in FIG. 3, even if exhaust gas is discharged at the same timing to the two paths, the exhaust gas that flows through the bypass passing path arrives at the air-fuel ratio sensor 56 in a shorter time. More specifically, when air-fuel ratios of exhaust gases that flow along two paths are detected at the same timing by the air-fuel ratio sensor 56, the cylinders for which the air-fuel ratios are detected are different to each other. Thus, since a cylinder for which an air-fuel ratio is detected and a fluctuation amount differ, respectively, according to the open or closed state of the WGV 40, unless this point is taken into consideration when performing air-fuel ratio feedback control, it is difficult to accurately correct a fuel injection amount of a given cylinder based on a variation in the air-fuel ratio of the cylinder in question.

Consequently, according to the present embodiment, a configuration is adopted in which a feedback correction amount is changed using air-fuel ratio feedback control (main feedback control) based on at least an open or closed state of the WGV 40. More specifically, according to the air-fuel ratio feedback control, first, a first fuel injection correction amount Δt that is a main feedback correction amount at a time that the WGV 40 is closed is calculated. The first fuel injection correction amount Δt is calculated by the following formula (1) based on an output of the air-fuel ratio sensor 56, an intake air amount detected by the airflow sensor 52, and a turbine passing path constant At.

[Formula 1]

$$\Delta t = \left( \frac{\text{INTAKE AIR AMOUNT}\,(k - At)}{\substack{\text{AIR-FUEL RATIO SENSOR} \\ \text{OUTPUT VALUE}\,(k)}} - \frac{\text{INTAKE AIR AMOUNT}\,(k - At)}{\substack{\text{TARGET AIR-FUEL} \\ \text{RATIO}\,(k - At)}} \right) \div \text{BASE INJECTION AMOUNT} \quad (1)$$

In the above formula, as described in the foregoing, the base injection amount is a known parameter that is calculated based on the number of engine revolutions, the load and the like. Further, an intake air amount (k), an air-fuel ratio sensor output (k) and a target air-fuel ratio (k) are detected (calculated) at each predetermined sampling timing that is set by the ECU 60, and are stored in the ECU 60 as time-series data, respectively. In this connection, a number "k" of the time-series data is an arbitrary natural number (k=1, 2, 3 . . . ). Further, the turbine passing path constant At is a value obtained by converting a transportation lag corresponding to a time required for exhaust gas to flow from inside the cylinder to the air-fuel ratio sensor 56 via the turbine passing path in a state in which the WGV 40 is closed into a constant.

Therefore, by referring to past time-series data by subtracting the turbine passing path constant At from the time-series data number, it is possible to compensate for an exhaust gas transportation lag that arises when the WGV 40 is closed. Consequently, according to the above formula (1), when the WGV 40 is in a closed state, a detection result of an air-fuel ratio that is detected for an arbitrary cylinder can be reflected in a fuel injection amount of the cylinder in question, and the detection cylinder and the control cylinder can be synchronized.

Further, in the air-fuel ratio feedback control, a second fuel injection correction amount Δb is calculated as a main feedback correction amount that corresponds to an open state of the WGV 40. The second fuel injection correction amount Δb is calculated by the following formula (2) based on an output of the air-fuel ratio sensor 56, an intake air amount, and a bypass path constant Ab.

[Formula 2]

$$\Delta b = \left( \frac{\text{INTAKE AIR AMOUNT}\,(k - Ab)}{\substack{\text{AIR-FUEL RATIO SENSOR} \\ \text{OUTPUT VALUE}\,(k)}} - \frac{\text{INTAKE AIR AMOUNT}\,(k - Ab)}{\substack{\text{TARGET AIR-FUEL} \\ \text{RATIO}\,(k - Ab)}} \right) \div \text{BASE INJECTION AMOUNT} \quad (2)$$

In the above formula, the bypass path constant Ab is a value obtained by converting a transportation lag corresponding to a time required for exhaust gas to flow from inside the cylinder to the air-fuel ratio sensor 56 via the bypass passing path in a state in which the WGV 40 is open into a constant. According to the bypass path constant Ab, by the same principle as that which applies to the turbine passing path constant At, an exhaust gas transportation lag that arises when the WGV 40 is open can be compensated for and the detection cylinder and the control cylinder can be synchronized. In this connection, the turbine passing path constant At and the bypass path constant Ab are set to respectively different values in accordance with the lengths of the turbine passing path and the bypass passing path.

Next, in the air-fuel ratio feedback control, the open or closed state of the WGV 40 is detected by a known method, and one fuel injection correction amount among the first and second fuel injection correction amounts Δt and Δb is selected as the normal main feedback correction amount based on at least the open or closed state. In this case, known methods for detecting the open or closed state of the WGV 40 include, for example, a method that directly detects a degree of opening of the WGV 40 by means of a degree of opening sensor or the like, and a method that detects an open or closed state based on an output of an exhaust pressure sensor or an exhaust gas temperature sensor that is arranged in the vicinity of an outlet of the WGV 40. Further, a method that uses a degree of opening target value of the WGV 40 that is set by supercharging pressure control as open/closed information or, for example as described in Japanese Patent Laid-Open No. 2010-185302, a method that uses a negative pressure that is supplied to a negative pressure actuator that drives the WGV 40 as open/closed information may also be used.

Next, the method of selecting the main feedback correction amount will be described in detail. First, based on the premise that the WGV 40 is closed, the first fuel injection correction amount Δt is initially selected as the normal main feedback correction amount. If the WGV 40 enters an open state and the first fuel injection correction amount Δt becomes greater than or equal to a divergence determination value α, the second fuel injection correction amount Δb is selected as the normal main feedback correction amount instead of the first fuel injection correction amount Δt.

The divergence determination value α is set to correspond to an allowable limit at which it is possible to use the first fuel injection correction amount Δt even if the WGV 40 is in an open state. More specifically, when the WGV 40 is open, the fuel injection correction amount Δt for a time when the WGV 40 is closed that does not conform to this state increases (diverges) with respect to a standard amount. Even in this state, when variations in the air-fuel ratio among cylinders are relatively small, fluctuations in the output waveform of the air-fuel ratio sensor 56 are also suppressed (that is, the fluctuation range of the output waveform shown by the dashed line in FIG. 2 decreases). Accordingly, in this case, since the influence on the fuel injection correction amount when there is a deviation between the detection cylinder and the control cylinder is also small, even if the fuel injection correction amount Δt (turbine passing path constant At) for a time when the WGV 40 is closed is used when the WGV 40 is open, the fuel injection amount can be corrected with sufficient accuracy up to a certain point (until Δt exceeds the allowable limit).

However, if the variations in the air-fuel ratio among cylinders are large, since the output waveform of the air-fuel ratio sensor 56 fluctuates significantly and the influence on the fuel injection correction amount when there is a deviation between the detection cylinder and the control cylinder is noticeable, the correction accuracy is liable to decrease if the fuel injection correction amount Δt for a time when the WGV 40 is closed is used when the WGV 40 is open. Therefore, in a state in which the WGV 40 is open, if the fuel injection correction amount Δt for a time when the WGV 40 is closed exceeds the allowable limit, more specifically, if Δt≥α is established, the fuel injection amount is corrected based on the fuel injection correction amount Δb for a time when the WGV 40 is open.

In the subsequent processing, the final fuel injection amount is calculated. More specifically, the fuel injection amount is calculated by the following formula (3) based on the aforementioned base injection amount, the normal main feedback correction amount obtained by the above described selection processing, and a learning value (main learning value) of the main feedback correction amount obtained by learning control. Thus, the results of the air-fuel ratio feedback control (main feedback control) and the learning control thereof are reflected in the fuel injection amount, and the air-fuel ratio is controlled so as to match the target air-fuel ratio.

[Formula 3]

$$\text{Fuel injection amount} = \text{base injection amount} \times (1 + \text{main feedback correction amount} + \text{main learning value}). \quad (3)$$

In this connection, according to the present embodiment a known control method may be adopted as the learning value (learning control) used in the above formula (3), or a control method described in Embodiment 2 that is described hereunder may be used. Further, according to the present embodiment, learning control need not necessarily be executed. Moreover, according to the present invention, a configuration may be adopted in which sub-feedback control and sub-learning control are used together so that a sub-feedback correction amount and a sub-learning value are reflected in the left side of the above formula (3). In this connection, an example of control in which sub-feedback control and sub-learning control are used together is described in Embodiment 4 and Embodiment 5 that are described hereunder.

According to the present embodiment, a constant corresponding to an exhaust gas transportation lag can be switched to either of the turbine passing path constant At and the bypass path constant Ab according to an open or closed state of the WGV 40, and the respective path constants can be reflected in the main feedback correction amount. It is thus possible to appropriately compensate for differences in an exhaust path length or in air-fuel ratio fluctuations that arise due to opening or closing of the WGV 40, by switching the path constant. More specifically, first, when the WGV 40 is in a closed state, the first fuel injection correction amount Δt in which the turbine passing path constant At is reflected can be taken as the main feedback correction amount. It is thereby possible to synchronize the detection cylinder for which the air-fuel ratio is detected and the control cylinder at which the main feedback correction amount is reflected, and effectively correct variations in the air-fuel ratio among cylinders.

Further, even when the WGV 40 is open, if the first fuel injection correction amount Δt is less than the divergence determination value α, it is judged that the influence will be small even if the fuel injection correction amount Δt is used for control, and thus the first fuel injection correction amount Δt can be taken as the main feedback correction amount. Consequently, even when the WGV 40 is open, when variations in the air-fuel ratio among cylinders are small, a detection value of an air-fuel ratio of exhaust gas that has been agitated (smoothed) by the turbine 36*a* can be used, and the air-fuel ratio can be accurately controlled. Since control of the air-fuel ratio is more accurate when carried out when the WGV is in a closed state in which an exhaust gas agitating effect of the turbine 36*a* is obtained, by adding a determination condition that uses the divergence determination value α, a control region in which the first fuel injection correction amount Δt is used can be extended to the open valve side.

In contrast, in a case where the WGV 40 is open and the first fuel injection correction amount Δt is greater than or equal to the divergence determination value α, it is judged that the accuracy will decrease if this fuel injection correction amount Δt is used for control, and thus a second fuel injection correction amount Δb in which the bypass path constant Ab is reflected can be taken as the main feedback correction amount. Therefore, even when the WGV 40 is open, the detection cylinder and the control cylinder can be synchronized. Further, even when there are large variations in the air-fuel ratio among cylinders due to the exhaust gas flowing through the bypass passage 38, since the fuel injection amount is corrected based on the second fuel injection correction amount Δb that corresponds to this state, the air-fuel ratio can be accurately controlled. Therefore, according to the present embodiment, the exhaust air-fuel ratio can be accurately and stably controlled without being influenced by the operating state of the WGV 40.

[Specific Processing to Realize Embodiment 1]

Next, specific processing to realize the above described control is described referring to FIG. 4. FIG. 4 is a flowchart that illustrates control executed by the ECU according to Embodiment 1 of the present invention. The routine shown in FIG. 4 is repeatedly executed during operation of the engine. According to the routine shown in FIG. 4, first, in step 100, based on the premise that the WGV 40 is closed, a transportation lag of feedback control (F/B control) is set as the turbine passing path constant At. Next, in step 102, by the above described formula (1), the first fuel injection correction amount (F/B correction amount) Δt is calculated based on the turbine passing path constant At and the output of the air-fuel ratio sensor 56 and the like.

Next, in step 104, the open or closed state of the WGV 40 is detected, and in step 106 it is determined whether or not the WGV 40 is in an open state. If the result determined in step 106 is negative, since the WGV 40 is in a closed state, the processing shifts to step 114 that is described later to calculate (correct) the fuel injection amount by the above described formula (3). In this case, the first fuel injection correction amount Δt is selected as the normal main feedback correction amount for calculating the fuel injection amount.

In contrast, if the result determined in step 106 is affirmative, since the WGV 40 is in an open state, in step 108 it is determined whether or not the first fuel injection correction amount Δt is equal to or greater than the divergence determination value α. If the result determined in step 108 is affirmative, in step 110 a transportation lag of the F/B control is set to the bypass path constant Ab. Next, in step 112, by the above described formula (2), the ECU 60 calculates the second fuel injection correction amount (F/B correction amount) Δb based on the bypass path constant Ab and the output of the air-fuel ratio sensor 56 and the like.

Subsequently, in step 114, the ECU 60 calculates the fuel injection amount by the above described formula (3) based on the normal main feedback correction amount Δt (or Δb) that has been calculated in either of steps 102 and 112 and the main learning value. Thus, the air-fuel ratio feedback control (main feedback control) can be realized.

Note that, in the above described Embodiment 1, steps 100 and 102 in FIG. 4 show specific examples of first correction amount calculation means according to the first aspects, and steps 110 and 112 in FIG. 4 show specific examples of second correction amount calculation means according to the first aspects. Further, steps 106 and 108 in FIG. 4 show specific examples of main correction amount selection means, among which step 106 shows a specific example of first selection means, and step 108 shows a specific example of second selection means. Furthermore, step 114 in FIG. 4 shows a specific example of air-fuel ratio control means.

Embodiment 2

Next, Embodiment 2 of the present invention is described with reference to FIG. 5. A feature according to the present embodiment is that, in addition to including the same configuration and control as the above Embodiment 1, learning control is executed when the WGV is closed. According to the present embodiment, components that are the same as in Embodiment 1 are denoted by the same reference symbols, and a description of such components is omitted.

[Features of Embodiment 2]

According to the present embodiment, learning control (main learning control) with respect to a main feedback control amount is executed. In the main learning control, in a case where the WGV 40 is in a closed state and the first fuel injection correction amount Δt is equal to or greater than a predetermined closed-valve time main learning determination value β, a steady-state portion among deviations of the first fuel injection correction amount Δt is learned. In this case, the closed-valve time main learning determination value β (hereunder, referred to simply as "learning determination value β") corresponds to an allowable limit in a case where the first fuel injection correction amount Δt increases, irrespective of a fact that air-fuel ratio feedback control is being executed.

More specifically, in the main learning control, first, formula (4) below is repeatedly determined while gradually changing a learning value GAF so that the first fuel injection correction amount Δt, the main learning value GAF up to that time point, and the learning determination value β satisfy the following formula (4).

$$|\Delta t - GAF| < \beta \qquad (4)$$

For example, when Δt=+2.5% and β=2%, GAF is gradually increased in the manner +0.2%→+0.4%→+0.6%. As a result, each time the routine shown in FIG. 4 is executed (at each computational cycle of the routine), the main learning value GAF increases, and the fuel injection correction amount Δt decreases by that amount. Further, for example, since the above formula (4) holds true at a time point at which GAF=+0.6%, and the left-hand side of the above formula (4) converges to a size that is less than the learning determination value β, the GAF value at this time is stored as a new main learning value and the learning control ends.

According to the present embodiment, the following operational advantages can be obtained in addition to the operational advantages of the foregoing Embodiment 1. That is, according to the present embodiment, when the WGV 40 is in a closed state, a steady-state portion of deviations of the first fuel injection correction amount (main feedback correction amount) Δt can be learned only in a case where the first fuel injection correction amount Δt has increased (diverged) significantly. As a result, learning control can be always executed accurately in a constant state (closed state) in which an exhaust gas agitating effect of the turbine 36a can be obtained. Accordingly, it is possible to increase the accuracy and stability of learning and to suppress variations in the main learning value that are caused by opening or closing of the WGV 40 and the like. Further, since learning control is executed only in a case in which learning is necessary due to an increase in the main feedback correction amount, excessive learning operations can be avoided.

[Specific Processing to Realize Embodiment 2]

Figure 5:
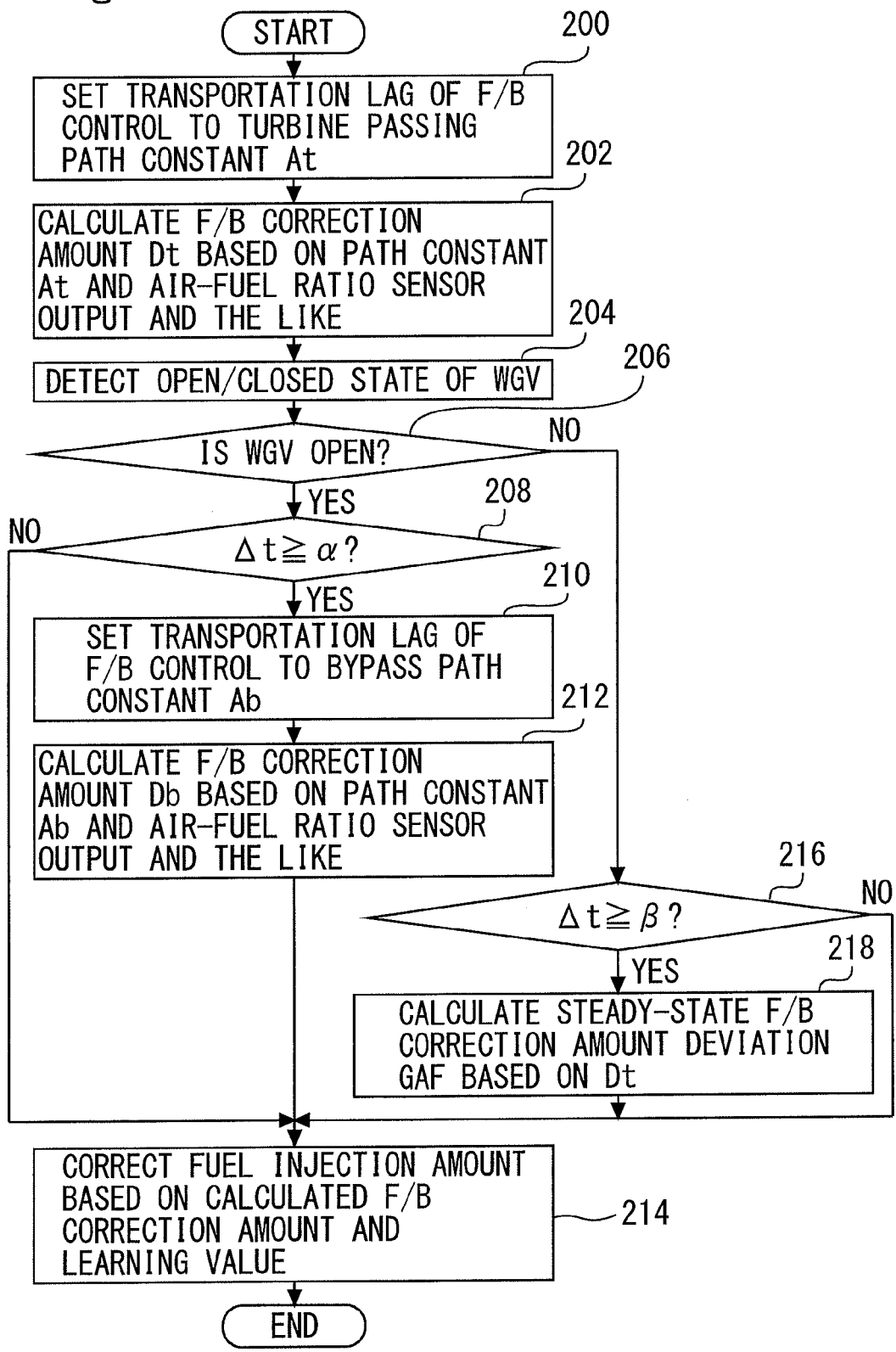
FIG. 5 is a flowchart that illustrates control executed by the ECU according to Embodiment 2 of the present invention.

Next, specific processing to realize the above described control is described referring to FIG. 5. FIG. 5 is a flowchart that illustrates control executed by the ECU according to Embodiment 2 of the present invention. The routine shown in FIG. 5 is repeatedly executed during operation of the engine. In the routine shown in FIG. 5, first, in steps 200, 202, 204, 206, 208, 210, 212, 214, processing is executed that is the same as in steps 100, 102, 104, 106, 108, 110, 112, 114 of Embodiment 1 (FIG. 4).

Further, if the ECU 60 determines that the WGV 40 is closed in step 206, subsequently, in step 216, the ECU 60 determines whether or not the first fuel injection correction amount Δt is equal to or greater than the learning determination value β. If the result determined in step 216 is affirmative, in step 218 the ECU 60 calculates the main learning value GAF that causes the above formula (4) to converge, and executes the above described learning control. The processing then shifts to step 214. In contrast, if the result determined in step 216 is negative, the processing shifts to step 214 without executing the learning control.

Note that, in the above described Embodiment 2, steps 200 and 202 in FIG. 5 show specific examples of first correction amount calculation means according to the first aspects, and steps 210 and 212 in FIG. 5 show specific examples of second correction amount calculation means. Further, steps 206 and 208 show specific examples of main correction amount selection means, among which step 206 shows a specific example of first selection, and step 208 shows a specific example of second selection means. Furthermore, step 214 shows a specific example of air-fuel ratio control means. Meanwhile, steps 216 and 218 show specific examples of closed-valve time main learning means.

Embodiment 3

Next, Embodiment 3 of the present invention is described with reference to FIG. 6. A feature according to the present embodiment is that, in addition to including the same configuration and control as the above Embodiment 1, learning control is executed when the WGV is closed and when the WGV is open. According to the present embodiment, components that are the same as in Embodiment 1 are denoted by the same reference symbols, and a description of such components is omitted.

[Features of Embodiment 3]

According to the present embodiment, a configuration is adopted in which main learning control executed when the WGV 40 is closed and main learning control executed when the WGV 40 is open are different, and two kinds of learning maps are used as appropriate. More specifically, first, when the WGV 40 is closed, main learning control (closed-valve time main learning control) is executed in the same manner as in the above described Embodiment 2, and a main learning value GAF for a time that the WGV 40 is closed is updated. In contrast, when the WGV 40 is open, open-valve time main learning control is executed that learns a steady-state portion among deviations of the fuel injection correction amount Δb as a main learning value GAFb for a time that the WGV 40 is open only in a case where the second fuel injection correction amount Δb is equal to or greater than an open-valve time main learning determination value γ, and in other cases the closed-valve time main learning control is executed. In this case, the open-valve time main learning determination value γ (hereunder, referred to simply as "learning determination value γ") corresponds to an allowable limit in a case where the second fuel injection correction amount Δb increases, irrespective of a fact that air-fuel ratio feedback control is being executed.

In the open-valve time main learning control, in a substantially similar manner to the closed-valve time main learning control, the following formula (5) is repeatedly determined while gradually changing the main learning value GAFb so that the second fuel injection correction amount Δb, the main learning value GAFb for a time that the WGV 40 is open up to that time point, and the learning determination value γ satisfy the following formula (5).

$$|\Delta t - GAFb| < \gamma \quad (5)$$

Thus, at a time point at which the above formula (5) holds true, the left-hand side thereof converges to a size that is less than the learning determination value γ, and hence the GAFb value at this time is stored as a new main learning value for a time that the WGV 40 is open, and the learning control ends. The ECU 60 is equipped with a main learning map for a time that the WGV 40 is closed that stores the main learning value GAF for a time that the WGV 40 is closed for each operating range of the engine, and a main learning map for a time that the WGV 40 is open that stores the main learning value GAFb for a time that the WGV 40 is open for each operating range of the engine. Further, in the air-fuel ratio feedback control, the learning value that is used in calculating a fuel injection amount is switched to either one of the main learning values GAF and GAFb in accordance with the open or closed state of the WGV 40.

According to the present embodiment, the following operational advantages can be obtained in addition to the operational advantages of the foregoing Embodiment 1. That is, according to the present embodiment, a main learning map for a time that the WGV 40 is closed and a main learning map for a time that the WGV 40 is open can be appropriately used in accordance with the open or closed state of the WGV 40, and the contents of a learning value to be reflected in a fuel injection amount can be appropriately switched. More specifically, for example, when the WGV 40 is in an open state, in a case in which variations in the air-fuel ratio among cylinders are relatively large or the like, if the learning value GAF that is learned when the WGV 40 is closed is used, even if the path constant is appropriately selected, the main feedback amount may diverge significantly. In this case, by switching to the learning value GAFb for a time that the WGV 40 is open, the main feedback amount can be decreased and control of the air-fuel ratio can be stabilized.

[Specific Processing to Realize Embodiment 3]

Figure 6:
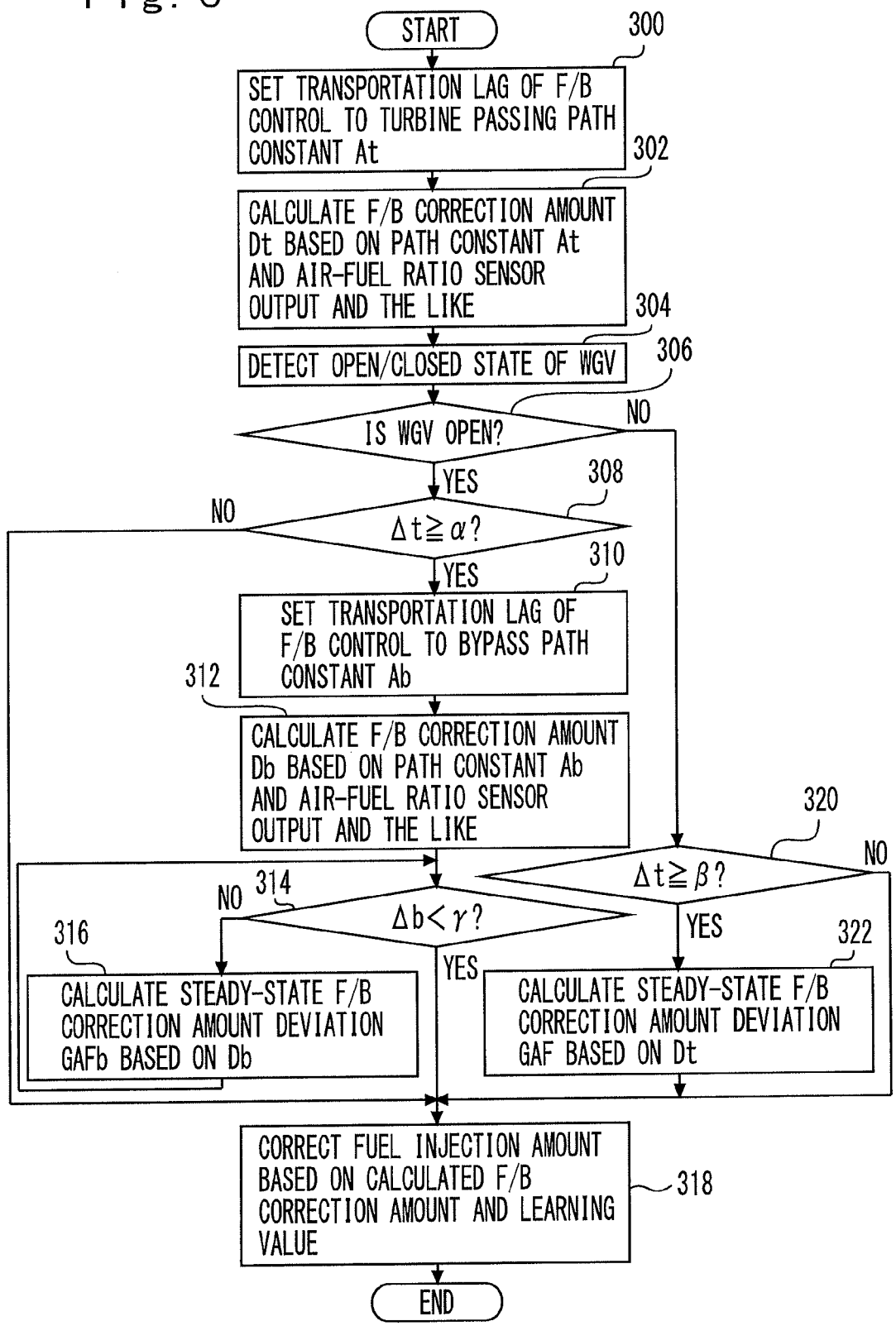
FIG. 6 is a flowchart that illustrates control executed by the ECU according to Embodiment 3 of the present invention.

Next, specific processing to realize the above described control is described referring to FIG. 6. FIG. 6 is a flowchart that illustrates control executed by the ECU according to Embodiment 3 of the present invention. The routine shown in FIG. 6 is repeatedly executed during operation of the engine. In the routine shown in FIG. 6, first, in steps 300, 302, 304, 306, 308, 310, 312, processing is executed that is the same as in steps 200, 202, 204, 206, 208, 210, 212 of Embodiment 2 (FIG. 5).

Subsequently, in step 314, the ECU 60 determines whether or not the second fuel injection correction amount (main feedback correction amount) Δb is less than the learning determination value γ. If the result determined in step 314 is negative, in step 316 the ECU 60 calculates a main learning value GAFb that causes the above formula (5) to converge, and executes the above described open-valve time main learning control. In contrast, if the result determined in step 314 is affirmative, in step 318 the ECU 60 calculates the fuel injection amount by the above formula (3) based on the calculated (selected) main feedback correction amount, main learning value and the like.

In contrast, in step 306, if the ECU 60 determines that the WGV 40 is in a closed state, the ECU 60 executes closed-valve time main learning control in a similar manner to steps 216 and 218 in FIG. 5. Thus, in step 318 (calculation of the fuel injection amount), the main learning value GAF is used when the WGV 40 is closed, and the main learning value GAFb is used when the WGV 40 is open.

Note that, in the above described Embodiment 3, steps 300 and 302 in FIG. 6 show specific examples of first correction amount calculation means, and steps 310 and 312 in FIG. 6 show specific examples of second correction amount calculation means. Further, steps 306 and 308 in FIG. 6 show specific examples of main correction amount selection means, among which step 306 shows a specific example of first selection means according to a second aspect, and step 308 shows a specific example of second selection means according to the second aspect. Furthermore, step 318 in FIG. 6 shows a specific example of air-fuel ratio control means. Meanwhile, steps 320 and 322 show specific examples of closed-valve time main learning means and steps 314 and 316 show specific examples of open-valve time main learning means.

Embodiment 4

Next, Embodiment 4 of the present invention is described with reference to FIG. 7. A feature according to the present embodiment is that, with the same configuration as the above Embodiment 1, the contents of sub-feedback control are switched based on an open or closed state of the WGV. According to the present embodiment, components that are the same as in Embodiment 1 are denoted by the same reference symbols, and a description of such components is omitted.

[Features of Embodiment 4]

According to the present embodiment, a configuration is adopted that changes a feedback correction amount that is used in sub-feedback control based on at least an open or closed state of the WGV 40. More specifically, in the sub-feedback control, first, the ECU 60 calculates a first sub-injection correction amount $\Delta O2t$ that is a sub-feedback correction amount for a time that the WGV 40 is closed. The first sub-injection correction amount $\Delta O2t$ is calculated by the following formula (6) based on an output O2out of the oxygen concentration sensor 58 and a turbine passing path target value Tt that corresponds to a time that the WGV 40 is closed. In this case, the turbine passing path target value Tt is an output target value of the oxygen concentration sensor 58 that corresponds to a time that the WGV 40 is closed, and is calculated by means of a predetermined target value data map based on the operating state (intake air amount and load factor and the like) of the engine.

$$\Delta O2t=(Tt-O2\text{out}) \quad (6)$$

Further, in the sub-feedback control, the ECU 60 calculates a second sub-injection correction amount $\Delta O2b$ as a sub-feedback correction amount that corresponds to an open state of the WGV 40. The second sub-injection correction amount $\Delta O2b$ is calculated by the following formula (7) based on the output O2out of the oxygen concentration sensor 58 and a bypass path target value Tb. Although in this case the bypass path target value Tb is calculated by a method that is substantially similar to the method of calculating the turbine passing path target value Tt, another target value data map is used for the calculation. More specifically, a target value data map that is used when the WGV 40 is closed and another target value data map that is used when the WGV 40 is open are previously stored in the ECU 60.

$$\Delta O2b=(Tb-O2\text{out}) \quad (7)$$

Next, in the sub-feedback control, the open or closed state of the WGV 40 is detected, and one correction amount among the first and second sub-injection correction amounts $\Delta O2t$ and $\Delta O2b$ is selected as the normal sub-feedback correction amount based on at least the detected open or closed state. More specifically, according to this selection processing, first, based on the premise that the WGV 40 is closed, the first sub-injection correction amount $\Delta O2t$ is initially selected as the normal sub-feedback correction amount.

Further, if the WGV 40 enters an open state and the first sub-injection correction amount $\Delta O2t$ becomes equal to or greater than a sub-divergence determination value $\alpha'$, the second sub-injection correction amount $\Delta O2b$ is selected as the normal sub-feedback correction amount instead of the first sub-injection correction amount $\Delta O2t$. For substantially the same purpose as setting the divergence determination value $\alpha$, the sub-divergence determination value $\alpha'$ is set to correspond to an allowable limit at which it is possible to use the first sub-injection correction amount $\Delta O2t$ even if the WGV 40 is in an open state.

Further, according to the present embodiment, learning control (sub-learning control) of a sub-feedback correction amount is executed. According to the sub-learning control, a steady-state portion among deviations of the first sub-injection correction amount $\Delta O2t$ is learned in a case where the WGV 40 enters a closed state and the first sub-injection correction amount $\Delta O2t$ becomes equal to or greater than a predetermined closed-valve time sub-learning determination value $\beta'$. In this case, the closed-valve time sub-learning determination value $\beta'$, (hereunder, referred to simply as "learning determination value $\beta'$") corresponds to an allowable limit in a case where the first sub-injection correction amount $\Delta O2t$ increases, irrespective of a fact that air-fuel ratio feedback control is being executed.

More specifically, in the sub-learning control, in substantially the same manner as in the case of the main learning control, formula (8) below is repeatedly determined while gradually changing a sub-learning value GO2 so that the first sub-injection correction amount $\Delta O2t$, a sub-learning value GO2 up to that time point, and the learning determination value $\beta'$ satisfy the following formula (8). Thus, at a time point at which formula (8) holds true, since the left-hand side thereof converges to a size that is less than the learning determination value $\beta'$, the GO2 value at that time is stored as a new sub-learning value, and the ECU 60 ends the learning control.

$$|\Delta O2t-GO2|<\beta' \quad (8)$$

In the subsequent processing, the ECU 60 calculates the final fuel injection amount. More specifically, the fuel injection amount is calculated by the following formula (9) based on the base injection amount, the main feedback correction amount, the main learning value, the sub-feedback correction amount, and the sub-learning value. Among these, the base injection amount, the main feedback correction amount, and the main learning value are described above in Embodiments 1 and 2. Further, the sub-feedback correction amount is selected based on the open or closed state of the WGV 40 or the like by the above described selection processing. According to the following formula (9), the main feedback control, the sub-feedback control, and the results of these learning controls are reflected in the fuel injection amount, and the air-fuel ratio is controlled so as to match the target air-fuel ratio.

[Formula 4]

Fuel injection amount=base injection amount×(1+ main feedback correction amount+main learning value)×(1+sub-feedback correction amount+sub-learning value) (9)

In this connection, according to the present embodiment the values described in Embodiments 1 and 2 are used as the main feedback correction amount and main learning value (main feedback control and main learning control) that are used in the above formula (9). However, according to the present invention, other known control methods that are different to these methods may be used, and the main feedback control and the main learning control need not be executed.

According to the present embodiment, the target value of sub-feedback control can be switched to either of the turbine passing path target value Tt and the bypass path target value Tb according to an open or closed state of the WGV 40, and the respective target values can be reflected in a sub-feedback correction amount. It is thereby possible to appropriately compensate for differences in the oxygen storage capacity of the exhaust purification catalyst 26 that arise due to opening or closing of the WGV 40 by switching the control target value. Thus, sub-feedback control can be correctly performed and the control accuracy with respect to the air-fuel ratio can be improved.

More specifically, when variations in the air-fuel ratio among cylinders are relatively large, the characteristics of exhaust gas flowing into the catalyst 26 differ according to the open or closed state of the WGV 40. That is, when the WGV 40 is closed, fluctuations in the air-fuel ratio are suppressed by the exhaust gas agitating effect of the turbine 36a, while, in contrast, when the WGV 40 is open, fluctuations in the air-fuel ratio increase relatively. Hence, a difference also arises in the rate of consumption of the oxygen storage capacity of the catalyst 26. Further, with respect to the rate of consumption of the oxygen storage capacity, in the case of a lean air-fuel ratio, the rate of consumption is slower when the WGV 40 is open compared to when the WGV 40 is closed, while in contrast, in the case of a rich air-fuel ratio, the rate of consumption is faster when the WGV 40 is open compared to when the WGV 40 is closed.

Thus, since the detection value of the oxygen concentration sensor 58 differs in accordance with whether the WGV 40 is in an open or closed state, it is also necessary to cause a sub-feedback correction amount for causing the detection value to converge to the target value to differ according to the open or closed state. In this regard, according to the present embodiment, the sub-feedback correction amount can be appropriately switched in accordance with the open or closed state of the WGV 40, that is, the rate of consumption of the oxygen storage capacity. Consequently, convergence accuracy with respect to the target value of the sub-feedback correction amount can be ensured without affecting the main feedback control, and the catalytic purifying capacity can be rapidly optimized.

Further, when the WGV 40 is in a closed state, the first sub-injection correction amount ΔO2t in which the turbine passing path target value Tt is reflected can be taken as the sub-feedback correction amount, and the sub-feedback control can be caused to conform to the oxygen storage capacity of the catalyst 26 at a time that the WGV 40 is in a closed state. Further, even when the WGV 40 is open, in a case where the first sub-injection correction amount ΔO2t is less than the sub-divergence determination value α', it is judged that the influence will be small even if this sub-injection correction amount ΔO2t is used for control, and thus the first sub-injection correction amount ΔO2t can be taken as the sub-feedback correction amount. Since control of the air-fuel ratio is more accurate when carried out when the WGV 40 is in a closed state in which an exhaust gas agitating effect of the turbine 36a is obtained, by adding a determination condition that uses the sub-divergence determination value α', a control region in which the first sub-injection correction amount ΔO2t is used can be extended to the open valve side.

In contrast, in a case where the WGV 40 is open and the first sub-injection correction amount ΔO2t is equal to or greater than the sub-divergence determination value α', it is judged that the accuracy will decrease if this sub-injection correction amount ΔO2t is used for control, and thus the second sub-injection correction amount ΔO2b in which the bypass path target value Tb is reflected can be taken as the sub-feedback correction amount. Therefore, even when the WGV 40 is open, convergence accuracy with respect to the target value of the sub-feedback correction amount can be ensured, and the catalytic purifying capacity can be rapidly optimized.

Further, according to the present embodiment, the sub-learning control can always be executed in a closed state in which the exhaust gas agitating effect of the turbine 36a is obtained. Accordingly, the accuracy and stability of learning can be enhanced, and variations in the sub-learning value that are caused by opening and closing of the WGV 40 and the like can be suppressed. Further, since learning control is executed only in a case in which learning is necessary due to an increase in the sub-feedback correction amount, excessive learning operations can be avoided.

[Specific Processing to Realize Embodiment 4]

Figure 7:
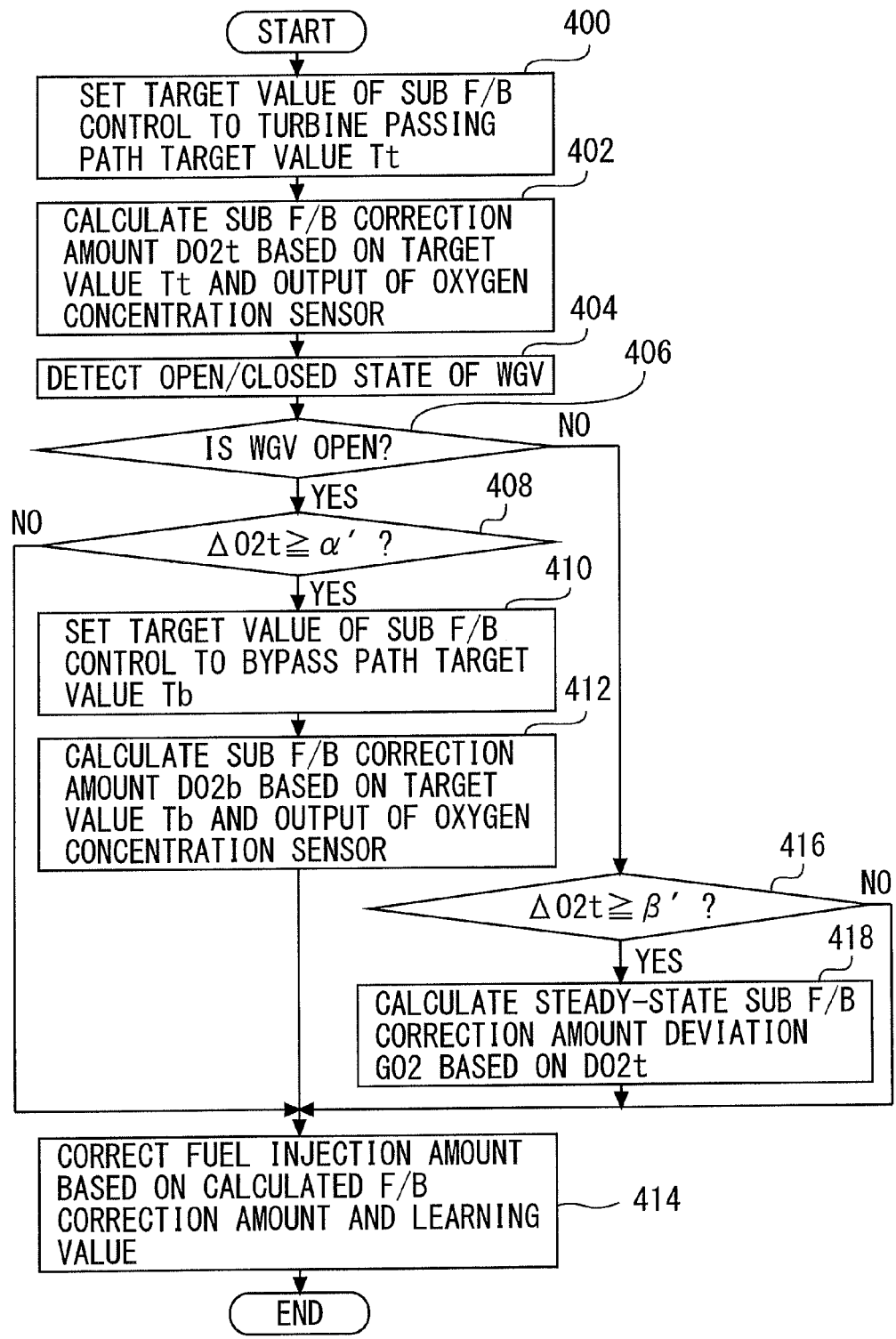
FIG. 7 is a flowchart that illustrates control executed by the ECU according to Embodiment 4 of the present invention.

Next, specific processing to realize the above described control is described referring to FIG. 7. FIG. 7 is a flowchart that illustrates control executed by the ECU according to Embodiment 4 of the present invention. The routine shown in FIG. 7 is repeatedly executed during operation of the engine. According to the routine shown in FIG. 7, first, in step 400, based on the premise that the WGV 40 is closed, a target value of sub-feedback control (F/B control) is set as the turbine passing path target value Tt. Next, in step 402, by the above described formula (6), the first sub-injection correction amount (sub-F/B correction amount) ΔO2t is calculated based on the output O2out of the oxygen concentration sensor 58 and the turbine passing path target value Tt.

Next, in step 404, the open or closed state of the WGV 40 is detected, and subsequently, in step 406, the ECU 60 determines whether or not the WGV 40 is in an open state. If the result determined in step 406 is affirmative, since the WGV 40 is in an open state, in step 408 the ECU 60 determines whether or not the first sub-injection correction amount ΔO2t is equal to or greater than the sub-divergence determination value α'. If the result determined in step 408 is affirmative, in step 410, the target value of the sub-feedback control is set to the bypass path target value Tb. In step 412, the ECU 60 calculates the second sub-injection correction amount ΔO2b based on the output O2out of the oxygen concentration sensor 58 and the bypass path target value Tb by the above described formula (7). In this case, the second sub-injection correction amount ΔO2b is selected as the normal sub-feedback correction amount, and the operation shifts to step 414 that is described later.

In contrast, if the result determined in step 406 is negative, since the WGV 40 is in a closed state, the first sub-injection correction amount ΔO2t is selected as the normal sub-feedback correction amount. Further, in this case, in step 416 the ECU 60 determines whether or not the first sub-injection correction amount ΔO2t is equal to or greater than the learning determination value β'. If the result determined in step 416 is affirmative, in step 418, the ECU 60 calculates the sub-learning value GO2 that causes the above described formula (8) to converge, and executes the aforementioned sub-learning control. Next, the processing shifts to step 414. On the other hand, if the result determined in step 416 is negative, the processing shifts to step 414 without executing the learning control.

In step 414, the ECU 60 calculates the final fuel injection amount by the above described formula (9) based on the normal sub-feedback correction amount ΔO2t (or ΔO2b) that is calculated in either of steps 402 and 412, the sub-learning value GO2 that is calculated in step 418, and the main feedback correction amount and the main learning value that is calculated with a different routine to the present routine (FIG. 7). Thus, main feedback control and sub-feedback control of the air-fuel ratio can be realized.

Note that, in the above described Embodiment 4, steps 400 and 402 in FIG. 7 show specific examples of first sub-correction amount calculation means, and steps 410 and 412 in FIG. 7 show specific examples of second sub-correction amount calculation means. Further, steps 406 and 408 in FIG. 7 show specific examples of sub-correction amount selection means, among which step 406 shows a specific example of first selection means and step 408 shows a specific example of second selection. Furthermore, step 414 in FIG. 7 shows a specific example of air-fuel ratio control means.

Embodiment 5

Figure 8:
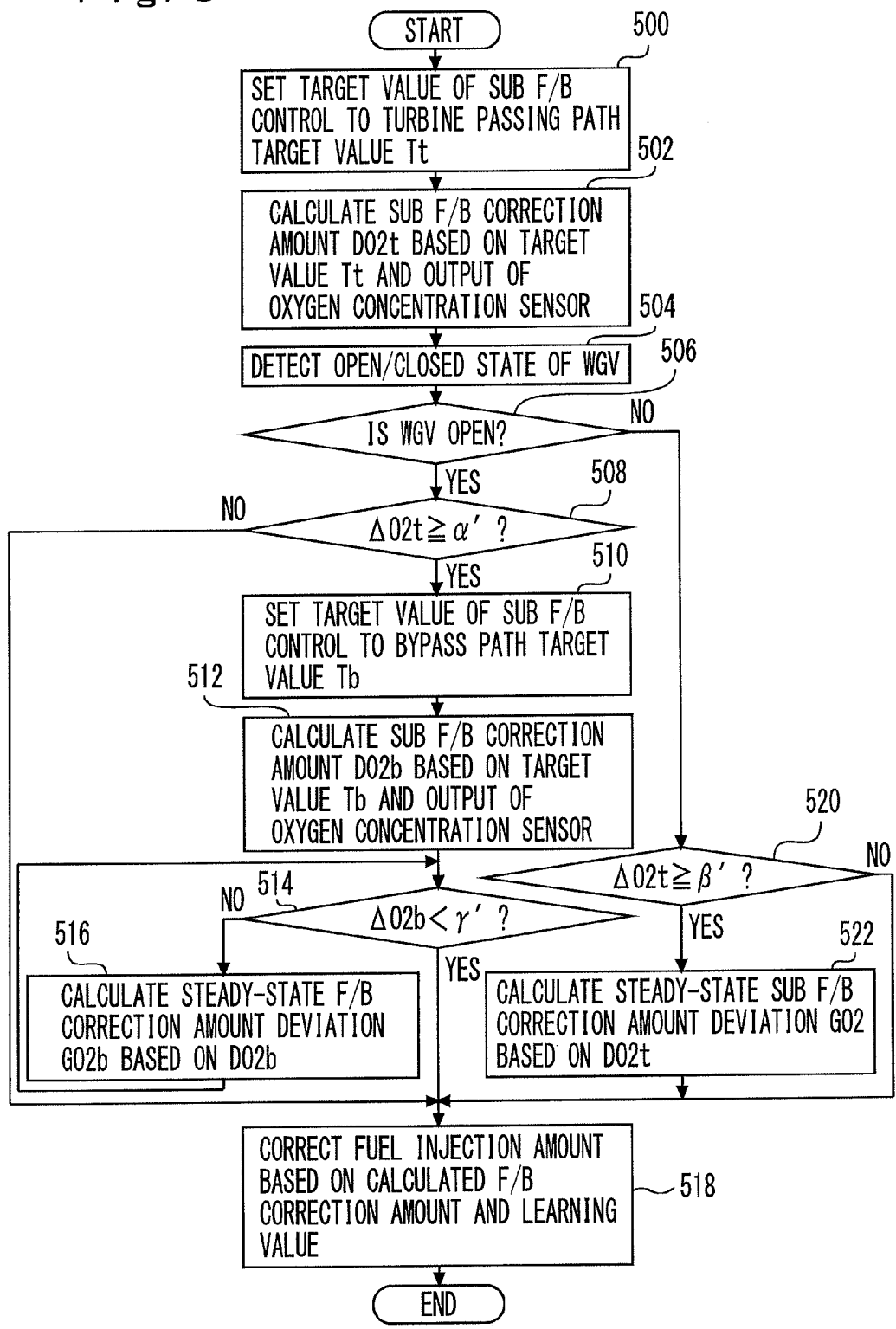
FIG. 8 is a flowchart that illustrates control executed by the ECU according to Embodiment 5 of the present invention.

Next, Embodiment 5 of the present invention is described referring to FIG. 8. A feature according to the present embodiment is that, with the same configuration as the above Embodiment 1, sub-learning control is executed when the WGV is closed and when the WGV is open. According to the present embodiment, components that are the same as in Embodiment 1 are denoted by the same reference symbols, and a description of such components is omitted.

[Features of Embodiment 5]

According to the present embodiment, a configuration is adopted in which sub-learning control that is executed when the WGV 40 is open and sub-learning control that is executed when the WGV 40 is closed are different, and two kinds of learning maps are used as appropriate. More specifically, first, when the WGV 40 is closed, sub-learning control (closed-valve time sub-learning control) is executed in the same manner as in the above described Embodiment 4, and a sub-learning value GO2 for a time that the WGV 40 is closed is updated. In contrast, when the WGV 40 is open, open-valve time sub-learning control is executed that learns a steady-state portion among deviations of the second sub-injection correction amount ΔO2b as the sub-learning value GO2b for a time that the WGV 40 is open only in a case where the second sub-injection correction amount ΔO2b is equal to or greater than a predetermined open-valve time sub-learning determination value γ', and in other cases the closed-valve time sub-learning control is executed.

In this case, the open-valve time sub-learning determination value γ' (hereunder, referred to simply as "learning determination value γ'") corresponds to an allowable limit in a case where, irrespective of a fact that air-fuel ratio feedback control is being executed, the second sub-injection correction amount ΔO2b increases. Further, the sub-learning value GO2b for a time that the WGV 40 is open is calculated by the following formula (10) in a substantially similar manner to the case of the sub-learning value GO2b.

$$|\Delta O2b - GO2b| < \gamma' \quad (10)$$

According to the present embodiment, the following operational advantages can be obtained in addition to the operational advantages of the foregoing Embodiment 4. That is, according to the present embodiment, a sub-learning map for a time that the WGV 40 is closed and a sub-learning map for a time that the WGV 40 is open can be appropriately used in accordance with the open or closed state of the WGV 40, and a sub-learning value to be reflected in a fuel injection amount can be appropriately switched in accordance with the rate of consumption of the oxygen storage capacity of the catalyst 26. Thus, irrespective of the open or closed state of the WGV 40, convergence accuracy with respect to the target value of the sub-feedback correction amount can be ensured, and the catalytic purifying capacity can be rapidly optimized.

[Specific Processing to Realize Embodiment 5]

Next, specific processing to realize the above described control is described referring to FIG. 8. FIG. 8 is a flowchart that illustrates control executed by the ECU according to Embodiment 5 of the present invention. The routine shown in FIG. 8 is repeatedly executed during operation of the engine. In the routine shown in FIG. 8, first, in steps 500, 502, 504, 506, 508, 510, 512, processing is executed that is the same as in steps 400, 402, 404, 406, 408, 410, 412 of Embodiment 4 (FIG. 7).

Subsequently, in step 514, the ECU 60 determines whether or not the second sub-injection correction amount (sub-feedback correction amount) ΔO2b is less than the learning determination value γ'. If the result determined in step 514 is negative, in step 516 the ECU 60 calculates the sub-learning value GO2b that causes the above formula (10) to converge, and executes the above described open-valve time sub-learning control. On the other hand, if the result determined in step 514 is affirmative, in step 518 the ECU 60 calculates the final fuel injection amount in substantially the same manner as in step 414 in FIG. 7.

In contrast, in step 506, if the ECU 60 determines that the WGV 40 is in a closed state, the ECU 60 executes closed-valve time sub-learning control in a similar manner to steps 416 and 418 in FIG. 7. Thus, in step 518 (calculation of the fuel injection amount), the sub-learning value GO2 is used when the WGV 40 is closed, and the sub-learning value GO2b is used when the WGV 40 is open.

Note that, in the above described Embodiment 5, steps 500 and 502 in FIG. 8 show specific examples of first sub-correction amount calculation means, and steps 510 and 512 in FIG. 8 show specific examples of second sub-correction amount calculation means. Further, steps 506 and 508 in FIG. 8 show specific examples of sub-correction amount selection means, among which step 506 shows a specific example of first selection means and step 508 shows a specific example of second selection means. Furthermore, step 518 shows a specific example of air-fuel ratio control means. Meanwhile, steps 520 and 522 show specific examples of closed-valve time sub-learning means and steps 514 and 516 show specific examples of open-valve time sub-learning means.

In this connection, in the foregoing Embodiments 1, 2 and 3, a configuration relating to main feedback control is described, while in the foregoing Embodiments 4 and 5, a configuration relating to sub-feedback control is described. However, the present invention also includes a configuration in which a configuration according to any of Embodiments 1, 2 and 3 and a configuration according to any of Embodiments 4 and 5 are combined.

Further, according to the respective embodiments described above, a configuration is adopted in which the closed state of the WGV 40 is taken as a basis, and a correction amount corresponding to the closed state is calculated (selected) in advance. Subsequently, if the correction amount becomes equal to or greater than the divergence determination value α or α' when the WGV 40 is open, a correction amount that corresponds to a time that the WGV 40 is open is calculated (selected). However, the present invention is not limited thereto. For example, a configuration may also be adopted in which the open state of the WGV 40 is taken as a basis and a correction amount corresponding to the open state is calculated (selected) in advance, and if the correction amount becomes equal to or greater than the divergence determination value α or α' when the WGV 40 is closed, a correction amount that corresponds to a time that the WGV 40 is closed is calculated (selected).

Further, although a configuration in which learning control is executed only when the WGV 40 is closed is adopted according to Embodiments 2 and 4, the present invention is not limited thereto, and a configuration may also be adopted in which learning control is executed only when the WGV 40 is open.

DESCRIPTION OF REFERENCE NUMERALS

10 engine (internal combustion engine), 12 piston, 14 combustion chamber, 16 crankshaft, 18 intake passage, 20 exhaust passage, 22 throttle valve, 24 intercooler, 26 exhaust purification catalyst, 28 fuel injection valve, 30 spark plug, 32 intake valve, 34 exhaust valve, 36 turbosupercharger, 36a turbine, 36b compressor, 38 bypass passage, 40 waste gate valve, 50 crank angle sensor, 52 airflow sensor, 54 intake air pressure sensor, 56 air-fuel ratio sensor, 58 oxygen concentration sensor, 60 ECU, At turbine passing path constant (turbine passing transportation lag), Ab bypass path constant (bypass passing transportation lag), Δt, Δb first, second fuel injection correction amounts, GAF, GAFb main learning value, α divergence determination value, β closed-valve time main learning determination value, γ open-valve time main learning determination value, Tt turbine passing path target value (output target value when the waste gate valve is closed), Tb bypass path target value (output target value when the waste gate valve is open), ΔO2t, ΔO2b first, second sub-injection correction amount, GO2, GO2b sub-learning value, α' sub-divergence determination value, β' closed-valve time sub-learning determination value, γ' open-valve time sub-learning determination value

The invention claimed is:

1. A control apparatus for an internal combustion engine, comprising:
   an exhaust purification catalyst that is provided in an exhaust passage of the internal combustion engine and that purifies an exhaust gas;
   a turbosupercharger that has a turbine that is provided in the exhaust passage on an upstream side of the exhaust purification catalyst, and that supercharges intake air utilizing an exhaust pressure;
   a bypass passage that branches from the exhaust passage on an upstream side of the turbine, and that merges with the exhaust passage at a position that is on a downstream side of the turbine and on an upstream side of the exhaust purification catalyst;
   a waste gate valve that adjusts an amount of exhaust gas that flows through the bypass passage;
   an air-fuel ratio sensor that is arranged on a downstream side of a position where the exhaust passage and the bypass passage merge, and that detects an air-fuel ratio on an upstream side of the exhaust purification catalyst;
   first correction amount calculation means that calculates a first fuel injection correction amount based on a turbine passing transportation lag that corresponds to a time that is required for exhaust gas to flow from inside a cylinder to the air-fuel ratio sensor via the turbine of the turbosupercharger, and an output of the air-fuel ratio sensor;
   second correction amount calculation means that calculates a second fuel injection correction amount based on a bypass passing transportation lag that corresponds to a time that is required for exhaust gas to flow from inside a cylinder to the air-fuel ratio sensor via the bypass passage, and an output of the air-fuel ratio sensor;
   main correction amount selection means that, based on at least an open or a closed state of the waste gate valve, selects one fuel injection correction amount among the first and the second fuel injection correction amounts as a main feedback correction amount; and
   air-fuel ratio control means that corrects a fuel injection amount of the internal combustion engine based on the main feedback correction amount that is selected by the correction amount selection means, and executes air-fuel ratio feedback control so that an air-fuel ratio that is detected by the air-fuel ratio sensor matches a target air-fuel ratio.

2. The control apparatus for an internal combustion engine according to claim 1, wherein the main correction amount selection means comprises:
   first selection means that, based on a premise that the waste gate valve is closed, selects the first fuel injection correction amount as the main feedback correction amount; and
   second selection means that, only in a case where the waste gate valve is in an open state and the first fuel injection correction amount is equal to or greater than a predetermined divergence determination value, selects the second fuel injection correction amount as the main feedback correction amount instead of the first fuel injection correction amount.

3. The control apparatus for an internal combustion engine according to claim 1, further comprising closed-valve time main learning means that, in a case where the waste gate valve is in a closed state and the first fuel injection correction amount is equal to or greater than a predetermined closed-valve time main learning determination value, performs learning of a correction amount based on the first fuel injection correction amount.

4. The control apparatus for an internal combustion engine according to claim 1, further comprising:
   closed-valve time main learning means that, in a case where the waste gate valve is in a closed state and the first fuel injection correction amount is equal to or greater than a predetermined closed-valve time main learning determination value, performs learning of a correction amount based on the first fuel injection correction amount; and
   open-valve time main learning means that, in a case where the waste gate valve is in an open state and the second fuel injection correction amount is equal to or greater than a predetermined open-valve time main learning determination value, performs learning of a correction amount based on the second fuel injection correction amount.

5. A control apparatus for an internal combustion engine, comprising:
- an exhaust purification catalyst that is provided in an exhaust passage of the internal combustion engine and that purifies an exhaust gas;
- a turbosupercharger that has a turbine that is provided in the exhaust passage on an upstream side of the exhaust purification catalyst, and that supercharges intake air utilizing an exhaust pressure;
- a bypass passage that branches from the exhaust passage on an upstream side of the turbine, and that merges with the exhaust passage at a position that is on a downstream side of the turbine and on an upstream side of the exhaust purification catalyst;
- a waste gate valve that adjusts an amount of exhaust gas that flows through the bypass passage;
- an air-fuel ratio sensor that is arranged on a downstream side of a position where the exhaust passage and the bypass passage merge, and that detects an air-fuel ratio on an upstream side of the exhaust purification catalyst;
- an oxygen concentration sensor that detects an oxygen concentration in an exhaust gas on a downstream side of the exhaust purification catalyst;
- first sub-correction amount calculation means that calculates a first sub-injection correction amount based on an output target value of the oxygen concentration sensor that corresponds to a time when the waste gate valve is closed, and an output of the oxygen concentration sensor;
- second sub-correction amount calculation means that calculates a second sub-injection correction amount based on an output target value of the oxygen concentration sensor that corresponds to a time when the waste gate valve is open, and an output of the oxygen concentration sensor;
- sub-correction amount selection means that, based on at least an open or a closed state of the waste gate valve, selects one sub-injection correction amount among the first and the second sub-injection correction amounts as a sub-feedback correction amount; and
- air-fuel ratio control means that corrects a fuel injection amount of the internal combustion engine based on a main feedback correction amount that is calculated based on an output of the air-fuel ratio sensor, and the sub-feedback correction amount, and executes air-fuel ratio feedback control so that an air-fuel ratio that is detected by the air-fuel ratio sensor matches a target air-fuel ratio.

6. The control apparatus for an internal combustion engine according to claim 5, wherein the sub-correction amount selection means comprises:
- first selection means that, based on a premise that the waste gate valve is closed, selects the first sub-injection correction amount as the sub-feedback correction amount; and
- second selection means that, only in a case where the waste gate valve is in an open state and the first sub-injection correction amount is equal to or greater than a predetermined sub-divergence determination value, selects the second sub-injection correction amount as the sub-feedback correction amount instead of the first sub-injection correction amount.

7. The control apparatus for an internal combustion engine according to claim 5, further comprising:
- closed-valve time sub-learning means that, in a case where the waste gate valve is in a closed state and the first sub-injection correction amount is equal to or greater than a predetermined closed-valve time sub-learning determination value, performs learning of a correction amount based on the first sub-injection correction amount; and
- open-valve time sub-learning means that, in a case where the waste gate valve is in an open state and the second sub-injection correction amount is equal to or greater than a predetermined open-valve time sub-learning determination value, performs learning of a correction amount based on the second sub-injection correction amount.

* * * * *